United States Patent [19]

Duke et al.

[11] Patent Number: 4,504,605

[45] Date of Patent: Mar. 12, 1985

[54] FILM-FORMING OLEFINIC NITRILE POLYMER LATEX AND METHOD OF PREPARING SAME

[75] Inventors: June T. Duke, Chagrin Falls; Herbert F. Mazeke, Warrensville Heights; Dorothy C. Prem, Sagamore Hills, all of Ohio

[73] Assignee: The Standard Oil Company, Cleveland, Ohio

[21] Appl. No.: 451,036

[22] Filed: Dec. 20, 1982

[51] Int. Cl.³ .............................................. C08F 20/34
[52] U.S. Cl. ................................... 523/201; 524/458; 525/902; 525/309; 525/310; 525/295
[58] Field of Search ........................ 524/458; 523/201; 525/902, 309, 310, 295

[56] References Cited

U.S. PATENT DOCUMENTS

| | | | |
|---|---|---|---|
| 3,296,176 | 1/1967 | Fantl | 523/201 |
| 3,351,602 | 11/1967 | Dunnavant et al. | 524/460 |
| 4,026,970 | 5/1977 | Backderf et al. | 525/902 |
| 4,038,344 | 7/1977 | Eisenbraun et al. | 525/310 |

FOREIGN PATENT DOCUMENTS 514899 7/1955 Canada .............................. 529/309

*Primary Examiner*—Paul R. Michl
*Assistant Examiner*—Alex H. Walker
*Attorney, Agent, or Firm*—Maky, Renner, Otto and Boisselle

[57] ABSTRACT

A stable aqueous latex of a copolymer containing at least about 40 percent by weight of a polymerized olefinic unsaturated nitrile is described. The copolymer comprises a main polymer core of from about 40 to 100 percent by weight of the polymerized nitrile and from about 0 to about 60 percent by weight of at least one other polymerized olefin monomer, said main polymer core being overpolymerized with a copolymer comprising a major proportion of a polymerized acrylate and from about one to 40 percent by weight of a polymerized olefinic unsaturated nitrile. A two-step method for preparing such a latex also is described. The latices of the invention are useful in forming films at low temperatures, and the minimum film forming temperature can be regulated by the selection of the particular components and the relative amounts of the components used to form the latices.

31 Claims, 2 Drawing Figures

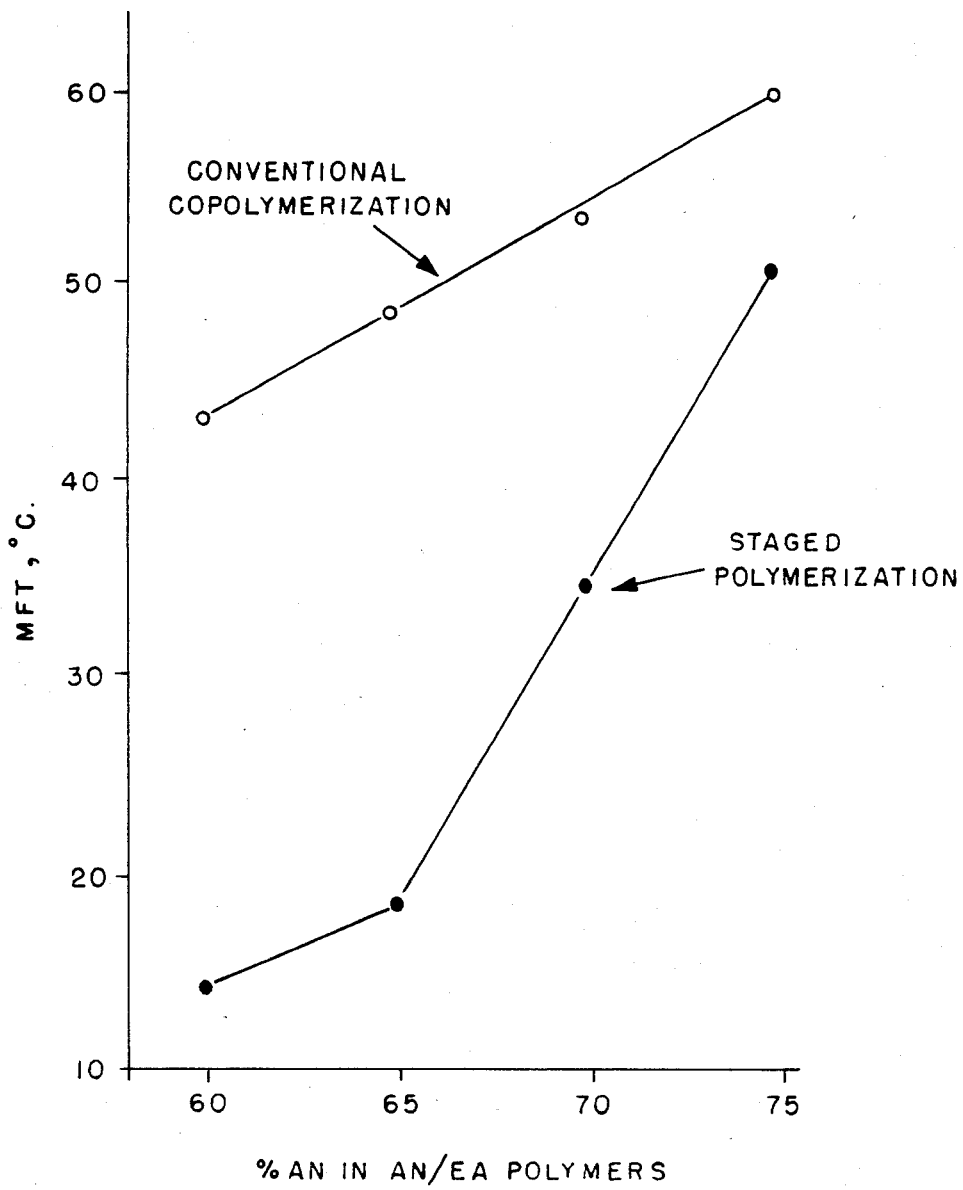

FILM-FORMING OLEFINIC NITRILE POLYMER LATEX AND METHOD OF PREPARING SAME

BACKGROUND OF THE INVENTION

This invention relates to certain novel film-forming nitrileacrylate ester copolymers, and more particularly to aqueous latices of nitrile-acrylate ester copolymers and to a method of preparing said copolymers, films and latices.

Synthetic copolymers and interpolymers of monomer mixtures comprising acrylonitrile and acrylate esters are well known and some of them have well-established commercial utility. Particularly useful are the high acrylonitrile copolymers containing 80% by weight or more of acrylonitrile and the low acrylonitrile copolymers containing 20% by weight or less of acrylonitrile. The high acrylonitrile copolymers and interpolymers are most generally used in the manufacture of synthetic fibers and the low acrylonitrile copolymers and interpolymers are useful as elastomers. More details concerning the state of the art of the aforementioned acrylonitrile interpolymers may be found, for instance, in U.S. Pat. Nos. 2,412,034, 2,558,396, 2,688,608, and 2,958,670, as well as Industrial and Engineering Chemistry, vol. 47, pages 1000 et seq. (1955), vol. 46, pages 1992 et seq. (1954), vol. 43, pages 2500 et seq. (1951), Journal of the American Chemical Society, vol. 65, pages 2067 et seq. (1943), and Rubber Age, February 1953, pages 636–637.

It is well known that it is difficult to prepare films at normal temperatures from a latex resulting from the polymerization or copolymerization of high proportions of acrylonitrile as disclosed in U.S. Pat. No. 3,047,522.

U.S. Pat. Nos. 3,236,798 and 3,351,602 describe latices having a minimum film-forming temperature no greater than 25° C. which comprise a copolymer containing from about 40 to 60 percent by weight of polymerized acrylonitrile. A copolymer is composed of a main polymer backbone or core of from about 70 to 95 percent by weight of polymerized acrylonitrile and from about 30 to 5 percent by weight of at least one other olefinically unsaturated monomer such as an acrylate ester which is copolymerizable with acrylonitrile, and said main polymer backbone or core is over polymerized with a major proportion of at least one acrylate ester such as, for example, ethyl acrylate. The latices described in these two patents exhibit a minimum film-forming temperature no greater than 25° C., and the process for preparing such latices described in the two patents is a two-step process.

SUMMARY OF THE DISCLOSURE

In accordance with the present invention, film-forming nitrileacrylate ester polymers are prepared which contain at least about 40 percent by weight of the nitrile, and more preferably, more than 60 percent by weight of the nitrile. More particularly, the present invention provides a method for preparing a stable latex of a film-forming polymer containing at least 40 percent by weight of polymerized olefinically unsaturated nitrile comprising the steps of (a) polymerizing in an aqueous medium a monomer mixture comprising from about 40 to 100 percent by weight of an olefinically unsaturated nitrile and from 0 to 60 percent by weight of at least one other olefinically unsaturated monomer which is copolymerizable with the nitrile, and (b) polymerizing in admixture with the polymer formed in step (a), an olefinic monomer constituent comprising a major proportion of at least one acrylate monomer having the structure

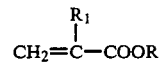

wherein R is an alkyl having from 1 to 30 carbon atoms and $R_1$ is hydrogen, an alkyl group having from 1 to 8 carbon atoms or a halogen, and from about 1 to about 40 percent by weight of an olefinically unsaturated nitrile.

The latex compositions are useful in forming protective coatings at low temperatures, and the minimum film-forming temperature can be controlled by selection of the components used to form the latex and in the relative amounts of said components.

BRIEF DESCRIPTION OF THE DRAWINGS

FIG. 2 is a graph showing a comparison of the minimum film-forming temperature obtained by conventional copolymerization and the two-stage polymerization of the present invention for several acrylonitrileethyl acrylate copolymers.

DESCRIPTION OF THE PREFERRED EMBODIMENTS

Figure 1:
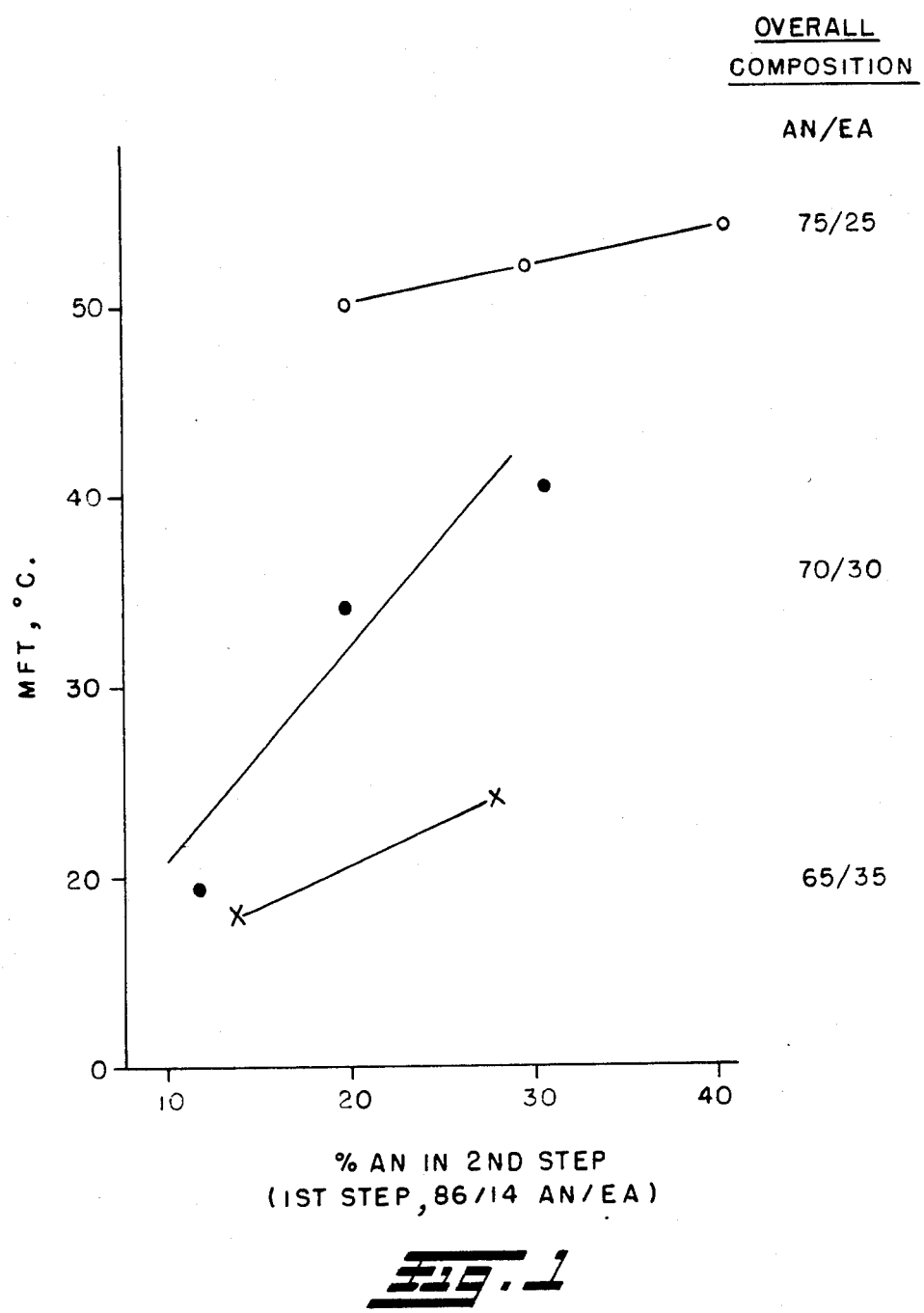
FIG. 1 is a graph showing the effect on the minimum film-forming temperature by varying the amount of acrylonitrile utilized in the second step of the method of the invention.

It now has been found that latex compositions useful as protective coatings can be prepared containing at least 40 percent by weight of polymerized olefinically unsaturated nitriles, and more preferably more than 60 percent by weight of polymerized olefinically unsaturated nitriles, and the compositions can be designed to have low minimum film-forming temperatures as well as other desirable properties such as the ability to form a continuous film when cast at low temperatures such as below about 60° C.

Latices having the desired nitrile content are prepared by a process which comprises the steps of (a) polymerizing in an aqueous medium a monomer mixture comprising from about 40 to 100 percent by weight of an olefinically unsaturated nitrile and from 0 to 60 percent by weight of at least one other olefinically unsaturated monomer which is copolymerizable with the nitrile, and (b) polymerizing in admixture with the polymer formed in step (a), an olefinic monomer constituent comprising a major proportion of at least one acrylate monomer having the structure

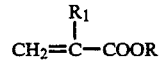

wherein R is an alkyl group having from 1 to 30 carbon atoms and $R_1$ is hydrogen, and alkyl group having from 1 to 8 carbon atoms or a halogen, and from about 1 to about 40 percent by weight of an olefinically unsaturated nitrile.

The olefinically unsaturated nitriles used in the present invention include the alpha, beta olefinically unsaturated mononitrile having the structure:

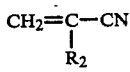

$$CH_2=C-CN$$
$$|$$
$$R_2$$

wherein $R_2$ is hydrogen, a lower alkyl group having from 1 to 4 carbon atoms or a halogen. Such compounds include acrylonitrile, alpha-chloro acrylonitrile, alpha-fluoro acrylonitrile, methacrylonitrile, ethyacrylonitrile and the like. The most preferred olefinically unsaturated nitriles useful in the present invention are acrylonitrile, methacrylonitrile and mixtures thereof.

The other olefinically unsaturated monomer utilized in step (a) may be any such monomer which is copolymerizable with the nitrile. Such useful monomers include one or more of the esters of olefinically unsaturated carboxylic acids, vinyl esters, vinyl ethers, vinyl ketones, alph-olefins, vinyl aromatic monomers and others.

The esters of olefinically unsaturated carboxylic acids include the acrylate esters having the structure:

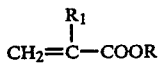

$$R_1$$
$$|$$
$$CH_2=C-COOR$$

wherein $R_1$ is hydrogen, an alkyl group having from 1 to 8 carbon atoms or a halogen and R is an alkyl group having from about 1 to 30 carbon atoms and preferably 1 and 4 carbon atoms. Compounds of this type include methyl acrylate, ethyl acrylate, the propyl acrylates, the butyl acrylates, the amyl acrylates, the hexyl acrylates, 2-ethyl hexylacrylate, glycidyl acrylate, methyl methacrylate, ethyl methacrylate, the propyl methacrylates, the butyl methacrylates, the amyl methacrylates, the hexyl methacrylates, glycidyl methacrylate, methyl alpha-chloro acrylates, ethyl alpha-chloro acrylates and the like. Most preferred are the lower acrylates such as methyl acrylate and ethyl acrylate.

Other useful olefinic monomers which are copolymerizable with the nitriles are the vinyl monomers such as the following: alpha, betaolefinically unsaturated carboxylic acids and their anhydrides including acrylic acid, methacrylic acid, alpha-chloro acrylic acid, alpha-bromo acrylic acid, alpha-cyano acrylic acid, maleic acid, maleic anhydride, alphachloro maleic acid, dichloromaleic anhydride, itaconic acid, sorbic acid and the like; the vinyl esters, such as vinyl acetate, vinyl propionate, the vinyl butyrates, isopropenyl acetate, isopropenyl propionate, the isopropenyl butyrates and the like; the vinyl ethers, such as methyl vinyl ether, ethyl vinyl ether, the propyl vinyl ethers, the butyl vinyl ethers, the amyl vinyl ethers, the hexyl vinyl ethers, cyclohexyl vinyl ether, phenyl vinyl ether, the heptyl vinyl ethers, the octyl vinyl ethers and the like; the vinyl halides such as vinyl chloride, vinyl fluoride, vinyl bromide, vinylidene chloride, vinylidene bromide, vinylidene fluoride, dichloro-difluoroethylene, chlorotrifluoroethylene, trifluoroethylene, chloroprene, and the like; olefins such as ethylene, propylene, butylenes, amylenes, hexylenes, heptylenes, octylenes, butadiene1,3, isoprene, styrene, alpha-methyl styrene, alpha-chloro styrene, and the like; vinyl cyanides, such as methacrylonitrile, maleic dinitrile, fumaronitrile, vinylidene cyanide and the like; vinyl amides, such as acrylamide, N-methyl acrylamide, N-methyl methacrylamide, N,N,-dimethyl acrylamide, N,N-dimethyl methacrylamide, N-t-butyl acrylamide, N-dodecyl acrylamide, N-phenyl acrylamide, N-vinyl pyrrolidone, and the like; vinyl amines, such as N-vinyl piperidine, the vinyl pyridines and the like; allyl esters, such as allyl acetate, allyl propionate, allyl butyrate, methallyl butyrate and the like.

The weight ratio of nitrile to other monomer utilized in step (a) can be varied over a wide range depending upon the desired result and upon the composition of the olefinic monomer constituent utilized in step (b). Generally, however, the monomer mixture utilized in step (a) will comprise from about 40 to 100 percent by weight of the olefinically unsaturated nitrile and from about 0 to 60 percent by weight of at least one other olefinically unsaturated monomer which is copolymerizable with the nitrile. More preferably, the monomer mixture in step (a) comprises from about 60 to 95 percent by weight of the nitrile and from about 40 to 5 percent by weight of the other monomer which is preferably at least one acrylate ester of the type described above.

In step (a), the polymer core of the latex particles is prepared conveniently in an aqueous medium in the presence of a suitable polymerization catalyst in the range of from about 15 to 60 percent of total solids and preferably at high conversion of monomers to polymer. Generally, a conversion of 90 percent or higher is desired. The aqueous medium may contain an emulsifier.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxyalkylene phosphonate acids and salts more fully described in U.S. Pat. No. 2,853,471, the so-called cationic emulsifiers such as the salts of strong inorganic acids and organic bases containing long carbon chains, for instance, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfonic ester and others may be used.

In addition to the above and other polar or ionic emulsifiers, still other materials which may be used, singly or in combination with one or more of the above types of emulsifiers include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The catalyst, usually required for satisfactory polymerization rate, may be any of those commonly employed for the polymerization of nitrile or acrylate esters including the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate, sodium, potassium and ammonium persulfate and others, such as those disclosed in U.S. Pat. Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidationreduction or "redox" types of catalyst and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulphur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of silver, copper, iron, cobalt, nickel and others. The preferred range of catalyst as above defined, is from about 0.01 to 5 parts by weight per one-hundred parts by weight of monomers.

While the polymerization may be carried out in the presence of air, the rate of reaction is ordinarily faster in the absence of oxygen and hence, polymerization in an evacuated vessel, at reflux, or under an inert atmosphere such as nitrogen or $CO_2$ is preferred. The temperatures at which the polymerization is carried out is not critical, and the temperature may be varied widely from $-30°$ C. to $100°$ C. or higher, though best results are generally obtained at a temperature of from about $0°$ C. to about $70°$ C. Although the pH of the polymerization system is not critical, it is preferred that a pH of about 6 be employed during the polymerization reaction. The polymer latex may be adjusted to any desired pH. The polymerization may be a batch polymerization or one or more of the components, i.e., monomers, catalyst, activator, emulsifier, water, etc. may be added incrementally or continuously during the polymerization reaction.

Still other substances which desirably may be incorporated into the reaction medium include mercaptan modifiers, buffers, electrolyte salts (see "Synthetic Rubber," G. S. Whitby, John Wiley and Sons, Inc., New York, 1954, pp. 226 and 227), carbon black and other pigments and fillers in a manner well understood in the art.

The properties of the latices of the present invention can be modified by conducting the polymerization reaction of the first step in the presence of a latex of a preformed diene elastomer. The diene rubber, prepared by conventional technique may be a homopolymer of a conjugated diene or a copolymer of a major proportion of a conjugated diene and a minor proportion of an olefinically unsaturated co-monomer. Generally the elastomer will contain from 50 to 90%, and preferably 60 to 80% of the diene.

The conjugated diene monomers useful in the present invention generally contain from 4 to 6 carbon atoms such as butadiene-1,3, isoprene, chloroprene, bromoprene, cyanoprene, 2,3,-dimethyl-butadiene-1,3 2-ethyl-butadiene-1,3, 2,3-diethyl-butadiene-1,3 and the like and others. Most preferred for the purpose of this invention are butadiene and isoprene because of their ready availability and their excellent copolymerization properties. The co-monomers useful in preparing the elastomers are preferably unsaturated nitriles, vinyl aromatic compounds and acrylic compounds. Examples of the nitriles include acrylonitrile, methacrylonitrile, etc. Examples of vinyl aromatic compounds include the styrene and substituted styrenes such as alpha-methyl styrene, alpha-ethyl styrene, the vinyl toluenes, the vinyl xylenes, etc. The acrylic compounds may be any of the acrylic compounds described above as one of the monomers copolymerizable with the nitrile in the first step. Examples include methyl acrylate, ethyl acrylate, methyl methacrylate, etc.

As mentioned, the diene latices useful in this invention are described in the art. For example, latices of 1,3-butadiene-acrylonitrile copolymers are described in U.S. Pat. Nos. 3,763,278 and 3,426,102, and latices of dienes with styrene are described in U.S. Pat. No. 3,763,278.

The following examples illustrate typical preparations of an elastomer latex useful in the invention.

EXAMPLE A

An acrylonitrile-butadiene copolymer elastomer latex is prepared using the following ingredients:

|  | Parts |
| --- | --- |
| Acrylonitrile | 30 |
| Butadiene-1,3 | 70 |
| t-Dodecyl mercaptan | 0.65 |
| Versene Fe-3 (41 percent active) | 0.05 |
| Soap flakes | 1.40 |
| Daxad 11 | 0.10 |
| Azobisisobutyronitrile | 0.40 |
| Water | 200 |

The polymerization is carried out with continuous agitation at $50°$ C. in the substantial absence of oxygen for 15 hours. The final latex has a total solids of 30.3 percent by weight.

EXAMPLE B

A rubber latex is prepared at $45°$ C. in the substantial absence of oxygen for a period of 5¼ hours employing a mixture of the following ingredients:

|  | Parts |
| --- | --- |
| Acrylonitrile | 40 |
| Butadiene-1,3 | 60 |
| Emulsifier | 2.4 |
| Potassium persulfate | 0.1 |
| t-Dodecyl mercaptan | 0.5 |
| Water | 200.0 |

The pH is adjusted to about 8 with ammonium hydroxide. At the end of the reaction a latex having 33% total solids in 97% conversion of monomers to polymer is obtained.

The amount of the preformed diene elastomer incorporated into the first step of the process and into the main polymer core can vary over a wide range depending on the properties desired in the final latex. The amount of diene elastomer in the step (a) mixture may be as high as 40 parts by weight on a solid basis based on 100 parts of monomer, but is generally below 20 parts by weight per 100 parts of monomer. Similarly the amount of diene elastomer in the final latex may be as high as 30 to 40 parts by weight on a solids basis and is generally below 20 parts by weight.

In the second step of the method of the present invention, namely, step (b), the polymer formed in step (a) is admixed with an olefinic monomer constituent which comprises a major proportion of at least one acrylate monomer having the structure $$CH_2=\underset{R_1}{\overset{|}{C}}-COOR$$

wherein R is an alkyl group having from 1 to 30 carbon atoms and $R_1$ is hydrogen, an alkyl group having from 1 to 8 carbon atoms or a halogen, and from about 1 to 40 percent by weight of an olefinically unsaturated nitrile. Preferably, $R_1$ is hydrogen and R contains from 1 to 4 carbon atoms. When R is a lower alkyl group such as methyl or ethyl, the film exhibits an improved ability to act as an oxygen barrier.

When the monomer mixture utilized in step (a) contains more than 60 percent by weight of the unsaturated nitrile, the olefinic monomer constituent utilized in step (b) may contain from 0 to 40 percent by weight of the olefinically unsaturated nitrile. Preferably, however, the monomer constituent utilized in step (b) will contain at least some of the nitrile and preferably from about 5 to 30 percent of the nitrile.

The olefinically unsaturated nitrile which may be included in the monomer constituent of step (b) may be any of the olefinically unsaturated nitriles which may be included in step (a). Preferably, the nitrile utilized in step (b) will be the same as the nitrile used in step (a).

The acrylate monomers which are included in the monomer constituent utilized in step (b) may be any of the acrylate monomers discussed above in respect to step (a). Generally, however, the acrylate monomer will be methyl acrylate, ethyl acrylate or mixtures thereof.

As mentioned above, the monomer constituent utilized in step (b) will comprise a major proportion of at least one acrylate monomer and from about 0 to about 40 percent by weight of an olefinically unsaturated nitrile. The monomer constituent used in step (b) also may contain other vinyl monomers in minor proportions, but preferably not greater than about 15 percent by weight relative to the essential nitrile and acrylate ester monomers. The vinyl monomers which may optionally be included in step (b) may be any of the vinyl monomers described above with respect to the monomer mixture utilized in step (a). In one preferred embodiment, the olefinic monomer constituent utilized in step (b) contains a mixture of an acrylate and a nitrile, and the amount of nitrile present in this mixture may range from about 10 to about 40 percent by weight or more.

The step (b) part of the present process may be carried out by emulsifying the olefinic monomer constituent in water, adding the resulting emulsion to the step (a) latex and then conducting a further polymerization of the acrylate-nitrile constituent. This polymerization step may be carried out by any of the procedures described above for the step (a) polymerization. The step (b) polymerization is carried out under conditions such that a stable dispersion is maintained after the addition of the final monomer component. It is preferred that the polymerization of the final monomer component in step (b) is made to occur only after the polymerization of the first (step (a)) polymer is substantially complete but while the polymer prepared by step (a) is still reactive.

In one embodiment of the invention, an excess of polymerization initiator is included in step (a), and this excess is available to effect the step (b) polymerization. In another embodiment, a polymerization initiator may be included in the above emulsion of olefinic monomer constituents which is added to the polymer obtained in step (a). The step (b) polymerization may be a batch polymerization, or one or more of the components, namely, monomers, catalysts, activator, emulsifier, water, etc., may be added incrementally or continuously during a polymerization reaction. Alternatively, an emulsion of all of the components used in step (b) can be prepared and slowly added in a continuous manner to the reaction mixture. In this manner, the exothermic nature of the reaction can be controlled, and, generally, a more uniform product can be obtained.

The polymers obtained by the process of the present invention can be prepared containing high concentrations of nitrile monomers while exhibiting desirable properties which are generally difficult to obtain with relatively hard nitrile polymers. By varying the distribution of both the nitrile monomer and the various comonomers in steps (a) and (b), latices may be prepared which exhibit minimum film-forming temperatures of from ambient temperature or below to 60° C. or higher while maintaining the overall nitrile content of at least about 40 percent by weight and more generally, over 60 percent and preferably 65 percent or higher. Generally, the major portion of the nitrile monomer is polymerized in the first step, and a smaller amount of the nitrile monomer is copolymerized in the second stage for improved compatibility with the particles formed in the first step. Also, variation of the nitrile monomer in the second step provides a means for controlling the relative hardness or softness of the final polymer particles. Within a given final composition, the minimum film-forming temperature may be controlled by the composition of the second step polymerization. This will be illustrated below with reference to FIG. 1.

The precise nature of the polymer obtained by the method of the invention is not completely understood. However, it appears that the formation of the final polymer proceeds in a step-wise fashion to form an initial particle in step (a) which grows in size during the step (b) polymerization. Thus, it is believed that the product of the step (a) polymerization is a main polymer chain or core. After the polymerization in the first step is substantially at an end, but while the polymer formed is in the nascent state, the olefinic monomer constituent of step (b) is added and polymerized. Thus, it is believed that the polymerization of the second step forms a shell or over-polymer around the main core. As mentioned above, by varying the monomer constituents utilized in step (b), the properties of the resulting polymer can be modified and controlled as desired.

In any event, whatever the nature of their structure, the polymers resulting from the process of this invention are quite different from interpolymers or copolymers of the same compositions or from blends of homopolymers and copolymers derived from similar compositions. Thus, the process of the present invention results in the formation of the polymeric products which differ in kind from, and are in other respects superior to, those of similar chemical compositions which have been described previously.

The film-forming latices and polymers of this invention are useful as such or in conjunction with other materials such as pigments, fillers, coloring agents and the like for coating, binding and impregnating a variety of materials.

In the following illustrative examples, the amounts of ingredients used are expressed in parts by weight unless otherwise indicated. Minimum film-forming temperatures (MFT) are determined using a 30-inch long bar constructed of brass with chrome plated surface having a heating means at one end, and a cooling means at the other. The latex is cast upon the bar and the temperature at the various parts along the bar is continuously determined by means of thermocouples. The temperature (minimum) at which an integral film formed is recorded as the MFT. For additional information concerning minimum filming temperature testing, see "Journal of Applied Polymer Science", Vol. 4, pages 81–85 (1960). Descriptions of film properties in general are based on observations of a 2.5–3 mil film cast on a glass plate from latex drawn down with a calibrated draw bar and dried.

Also in the following examples, commercial materials utilized have the following compositions:

GAFAC RE-610 (General Aniline and Film Corp.)-an emulsifier of the class of mixtures of $RO(CH_2CH_2O-)_nPO_3M_2$ and $[RO(CH_2CH_2O)_n-]_2PO_2M$ wherein n is a number of from 1 to 40, R is an alkyl or alkaryl group and preferably a nonyl phenyl group and M is hydrogen, ammonia or an alkali metal.

DAXAD 11 (Dewey and Almy Chemical Company)-a sodium salt of a polymerized alkyl naphthalene sulfonic acid.

EXAMPLE 1

This polymerization is conducted in a three-liter stainless-steel reactor in a nitrogen atmosphere with a marine propeller for agitation. The over-all recipe in parts per 100 parts total monomer is as follows:

65 pts acrylonitrile
35 pts ethyl acrylate
212.5 pts distilled water
2.35 pts GAFAC RE-610
0.114 pts DAXAD 11
0.168 pts $K_2S_2O_8$
0.035 pts $Na_2S_2O_5$ For the first step reaction, all of the GAFAC RE-610 emulsifier and the DAXAD 11 are dissolved in 133 parts of water. The pH of the emulsifier solution is adjusted to 6.0 with dilute ammonium hydroxide, and the solution then is charged to the reactor. A mixture of 61 parts of acrylonitrile and 9.8 parts of ethyl acrylate is prepared and added to the reactor with agitation. The reaction mixture is heated to 35° C. and the total chage of 0.168 parts of potassium persulfate is added as an aqueous solution. The sodium bisulfite (0.035 parts) is dissolved in 25 ml of water, and 4 ml of this solution is added to the reactor for initiation. Additional increments are added during polymerization to maintain a desirable reaction rate.

In about two hours, the conversion of monomer to polymer is about 95 percent, and the second step ingredients are then added as follows. The remaining DAXAD 11 (0.051 parts) is dissolved in 62 parts of water and added to the reactor followed by four parts of acrylonitrile and 25.2 parts of ethyl acrylate. The reaction is continued by adding further increments of the bisulfite solution as needed to maintain a good reaction rate. The overall conversion of monomer to polymer reaches about 96 percent after about 1.5 hours, and the reaction was cooled to room temperature to yield the desired product.

In this example, the ratio of monomers in the first step is 86 parts acrylonitrile to 14 parts ethyl acrylate. In the second step, the ratio is 14 parts of acrylonitrile to 86 parts of ethyl acrylate. The overall monomer composition of the product of this example is 65 parts of acrylonitrile to 35 parts of ethyl acrylate.

The minimum film-forming temperature (MFT) of the latex obtained in this example is measured on a temperature gradient bar and found to be 18° C. When spread on a glass plate at room temperature (approximately 25° C.), the latex forms a smooth continuous transparent film with a slight haze. The film is easily stripped from the glass and is quite flexible.

In comparison, a conventional copolymer which has the same overall monomeric composition, namely, 65 parts of acrylonitrile to 35 parts of ethyl acrylate is made in a similar recipe by charging all of the monomers initially and completing the copolymerization in a single step. The latex obtained in this manner has a minimum film-forming temperature of 48° C. and will not form a film at room temperature.

EXAMPLES 2–9

In this series of examples, the procedure of Example 1 is followed, and the amounts of acrylonitrile and ethyl acrylate utilized in the examples is as shown in the following Table I. In all of these examples, the ratio of acrylonitrile to acrylate in the first step polymerization is maintained at 86 parts acrylonitrile/14 parts ethyl acrylate, and the ratio of acrylonitrile to ethyl acrylate in the second step polymerization is varied. As can be seen from the results summarized in Table I, within a given overall composition, the minimum film-forming temperature of the latex can be further varied by changing the monomer ratio in the second step of the polymerization. In the table and elsewhere in this specification, AN represents acrylonitrile, EA represents ethyl acrylate and MA represents methyl acrylate.

TABLE I

| Example | Overall Composition (pts) | % Total Monomer In Step 1 | % Total Monomer In Step 2 | Monomer Ratio Step 2 (pts) | Latex MFT (°C.) |
|---|---|---|---|---|---|
| 2 | 75AN/25EA | 75 | 25 | 41AN/59EA | 54 |
| 3 | " | 80 | 20 | 30AN/70EA | 52 |
| 4 | " | 80 | 20 | 20AN/80EA | 50 |
| 5 | 70AN/30EA | 70 | 30 | 31AN/69EA | 40 |
| 6 | " | 76 | 24 | 20AN/80EA | 34 |
| 7 | " | 78 | 22 | 12AN/88EA | 19 |
| 8 | 65AN/35EA | 64 | 36 | 28AN/72EA | 24 |
| 9 | " | 71 | 24 | 14AN/86EA | 18 |

The effect of variations in the change of monomer ratio in the second step polymerization is illustrated in the graph of FIG. 1. As can be seen, within a latex of a given overall composition of acrylonitrile/ethyl acrylate, the minimum film-forming temperature (MFT) can be controlled or adjusted by varying the amount of acrylonitrile in the second step. The results obtained in Examples 2–9 indicate that the MFT increases with an increase in the amount of acrylonitrile in the monomer constituent of the second step.

EXAMPLE 10

The general procedure described for Example 1 is repeated except that the monomer ratio in step 1 is 86 parts of acrylonitrile and 14 parts of methyl acrylate, and the monomer ratio in the second step is 14 parts of acrylonitrile and 86 parts of ethyl acrylate. In this experiment, 71 percent of the total monomer is polymerized in the first step, and 29 percent of the total monomer is polymerized in the second step. The overall composition of the latex prepared in this manner is 65 parts acrylonitrile/10 parts methyl acrylate/25 ethyl acrylate. The minimum film-forming temperature of this latex is 15° C.

EXAMPLE 11

The general procedure for Example 1 is repeated except that the monomer ratio in the first step is 86 parts of acrylonitrile and 14 parts of methyl acrylate, and the monomer ratio in the second step is 14 parts of acrylonitrile, 17 parts of methyl acrylate and 69 parts of ethyl acrylate. In this experiment 71 percent of the total monomer is polymerized in the first step or 29 percent of the total monomer is polymerized in the second step. The overall composition of this latex is 65 parts acrylonitrile/15 parts methyl acrylate/20 parts ethyl acrylate, and the minimum film-forming temperature of the latex is 15° C.

EXAMPLE 12

The general procedure of Example 1 is repeated except that the monomer ratio in step 1 is 86 parts of acrylonitrile and 14 parts of ethyl acrylate, and the monomer ratio in the second step is 14 parts of acrylonitrile, 51 parts of methyl acrylate and 36 parts of ethyl acrylate. In this experiment, 71 percent of the total monomer is polymerized in the first step, and 29 percent of the total monomer is polymerized in the second step. The overall composition of the latex prepared in this manner is 65 parts of acrylonitrile, 15 parts of methyl acrylate and 20 parts of ethyl acrylate. The minimum film-forming temperature of this latex is 30° C.

EXAMPLE 13

The general procedure of Example 1 is repeated except that the monomer ratio in step 1 is 86 parts of acrylonitrile and 14 parts of methyl acrylate, and the monomer ratio in step 2 is 14 parts of acrylonitrile, 35 parts of methyl acrylate and 51 parts of ethyl acrylate. In this experiment, 71 percent of the total monomer is polymerized in the first step, and 29 percent of the total monomer is polymerized in the second step. The latex obtained in this manner has an overall composition of 65 parts of acrylonitrile, 20 parts of methyl acrylate and 15 parts of ethyl acrylate. The minimum film-forming temperature of the latex is 24° C.

EXAMPLE 14

The general procedure of Example 1 is repeated except that the monomer ratio in the first step is 86 parts of acrylonitrile and 14 parts of ethyl acrylate, and the monomer ratio in step 2 is 14 parts of acrylonitrile, 36 parts of ethyl acrylate and 50 parts of n-butyl acrylate. In this experiment, 71 percent of the total monomer is polymerized in the first step, and 29 percent of the total monomer is polymerized in the second step. The overall composition of the latex prepared in this manner is 65 parts of acrylonitrile/20.5 parts of ethyl acrylate and 14.5 parts of n-butyl acrylate. The minimum film-forming temperature of this latex is 14° C.

EXAMPLE 15

The general proceudre of Example 1 is repeated except that the monomer ratio in step 1 comprises 80 parts of acrylonitrile and 20 parts of ethyl acrylate, and the monomer ratio in step 2 comprises 15 parts of acrylonitrile and 85 parts of ethyl acrylate. In this experiment, 54% of the total monomer is polymerized in the first step, and 46% of the total monomer is polymerized in the second step. The latex obtained in this manner has an overall composition of 50 parts of acrylonitrile and 50 parts of ethyl acrylate.

EXAMPLE 16

The general procedure of Example 1 is repeated except that the monomer ratio in step 1 is 80 parts of acrylonitrile and 20 parts of ethyl acrylate, and the monomer used in step 2 is ethyl acrylate. In this experiment, 85% of the total monomer is polymerized in the first step and 15% is polymerized in the second step. The latex obtained in this manner has an overall composition of 68 parts of acrylonitrile and 32 parts of ethyl acrylate.

EXAMPLE 17

The general procedure of Example 1 is repeated except that methyl acrylate is used in lieu of ethyl acrylate. The monomer ratio in step 1 is 86 parts of acrylonitrile and 14 parts of methyl acrylate and the monomer ratio in step 2 is 14 parts of acrylonitrile and 86 parts of methyl acrylate. In this experiment, 64% of the total monomer is polymerized in the first step and 36% in the second step. The latex obtained in this manner has an overall composition of 60 parts of acrylonitrile and 40 parts of methyl acrylate, and an MFT of 32° C.

EXAMPLE 18

The procedure of Example 17 is repeated except that the methyl acrylate is replaced by equivalent amounts of ethyl acrylate. The MFT of the latex prepared in this manner is 14° C.

EXAMPLE 19

The general procedure of Example 18 is repeated with the exception that 52 parts of a latex containing an elastomer of the composition of 70 parts of 1,3-butadiene and 30 parts of acrylonitrile (similar to the latex of Example A) is added to the reactor containing the solution of the emulsifier and DAXAD 11 in water prior to the addition of the first step monomer mixture. The final overall polymer composition prepared in this manner is 60 parts of acrylonitrile, 40 parts of ethyl acrylate and 10 parts of elastomer (solids basis). The minimum film-forming temperature of this latex determined on a temperature gradient bar is less than 18° C., and a film dried at room temperature on a glass plate is transparent with a slight haze. The film strips readily from the glass plate, is very flexible, and has a greater resistance to tearing than the comparable non-rubber-containing film.

EXAMPLE 20

This example illustrates the two-step process of the present invention utilizing a continuous addition of monomer in the second step. The overall polymeric composition of the latex prepared in this example is 65 parts of acrylonitrile and 35 parts of ethyl acrylate, and the recipe is otherwise the same as used in Example 1 with the exception that only 0.1 part of the potassium persulfate is used and water is reduced to 150 parts per 100 parts of monomer. At the completion of the first step, the reactor contents are cooled to room temperature whereupon distilled water and DAXAD 11 are added. Of the total monomer mixture to be polymerized in the second step, 15 percent of that amount is added, the reactor contents are stirred for 15 minutes, and then the reactor contents are heated to a reaction temperature of 35° C. The remaining monomer mixture is continuously pumped into the reactor over a 90-minute period, and increments of an aqueous solution of sodium bisulfite (0.00168 parts per 100 parts of monomer per increment) are injected into the reactor at 15-minute intervals during the addition period. After the last initiator injection, the reaction is continued for 20 minutes, and the reactor contents are cooled to room temperature. The latex obtained in this manner had a total solids content of 39.8 percent corresponding to an overall conversion of monomer to polymer of 98 percent.

The monomer ratio in the first step is 86 parts acrylonitrile/14 parts ethyl acrylate, and in the second step, 28 parts of acrylonitrile/72 parts of ethyl acrylate. Of the total monomer mixture, 64 percent is polymerized in the first step and 36 percent in the second step to provide an overall composition of 65 parts acrylonitrile/35 parts ethyl acrylate.

The latex obtained in this manner shows a minimum film-forming temperature of 25° C. when spread on a temperature gradient bar. As a result of the continuous addition of monomer in the second step, and the small incremental initiator additions, the reaction exotherm is minimized, temperature extremes are avoided and an overall smoother, more consistant reaction is achieved. The process of this example provides a stable latex at an increased solids level.

The advantage of the two-step process of this invention in preparing latices having low minimum film-forming temperatures as compared to the convention one-step prior art method is illustrated in the following Table II where a comparison is made of the MFT of various latices made by both the two-step polymerization technique of this invention and the one-step polymerization technique of the prior art. As can be seen from the results, the latices of the present invention of a given overall composition exhibited a lower MFT when compared to latices of the same overall composition, but prepared by the conventionl one-step method. Moreover, the latices of the present invention form good uniform films on heated bars which can be stripped readily from the bar whereas the films prepared from the prior art latices or blends may form spotty, non-uniform, partly coalesced films which often cannot be lifted from the bar without powdering.

TABLE II

| Overall Compositions | MFT (°C.) | |
|---|---|---|
| (AN/EA, pts) | 2-Step Process | 1-Step Process |
| 60/40 | 14 | 43 |
| 65/35 | 18 | 48 |
| 70/30 | 34 | 53 |
| 75/25 | 50 | 59 |

The relationships between the above found MFT's is illustrated graphically in FIG. 2. The reduction in the MFT of the two-step polymerization process of the present invention when compared to conventional copolymerization is readily apparent.

Latex particle size measurements have been made by transmission electron microscopy of the particles obtained in each step of the two-step polymerization process of this invention. The following Table III summarizes the results of this investigation on the products obtained in several of the above examples. The results summarized in the table demonstrate particle growth as a result of the second polymerization reaction as evidenced by the increase in average size, and the narrowing of the particle-size distribution as shown by dispersity values.

TABLE III

| | | | Particle Size Measurements | | | | | |
|---|---|---|---|---|---|---|---|---|
| | Overall Composition | Step 1 Composition | Step 2 Composition | Number Average Particle Size A° | | | Dispersity* | |
| Example | (pts) | (pts) | (pts) | Step 1 | Step 2 | Change (%) | Step 1 | Step 2 |
| 9 | 65/35 AN/EA | 86/14 AN/EA | 14/86 AN/EA | 532 | 613 | +15 | 1.067 | 1.055 |
| 6 | 70/30 AN/EA | 86/14 AN/EA | 20/80 AN/EA | 451 | 515 | +14 | 1.069 | 1.066 |
| 10 | 65/10/25 AN/MA/EA | 86/14 AN/MA | 14/86 AN/EA | 432 | 470 | +9.5 | 1.052 | 1.047 |
| 11 | 65/15/20 AN/MA/EA | 86/14 AN/EA | 14/17/69 AN/MA/EA | 411 | 496 | +21 | 1.067 | 1.060 |

*Dispersity value = $\frac{\text{Volume avg., A°}}{\text{Number avg., A°}}$

The latices prepared in accordance with the two-step polymerization process of this invention exhibit excellent shelf life and are stable for prolong periods with minimum change in the viscosity of the latices. Films obtained from the latices of the invention exhibit desirable oxygen barrier levels and excellent oil-resistance.

We claim:

1. A method of preparing a stable latex of a film-forming polymer containing at least 40 percent by weight of polymerized olefinically unsaturated nitrile comprising the steps of
   (a) forming a main polymer core of latex particles by polymerizing in an aqueous medium a monomer mixture comprising from about 40 to 100 percent by weight of an olefinically unsaturated nitrile and from 0 to 60 percent by weight of at least one other olefinically unsaturated monomer which is copolymerizable with the nitrile, wherein the polymerization is conducted in the presence of a preformed homopolymer of a conjugated diene or a copolymer comprising a major proportion of a conjugated diene and a minor proportion of an olefinically unsaturated comonomer, and
   (b) forming a polymer shell over said polymer core by polymerizing in admixture with the polymer formed in step (a), an olefinic monomer constituent comprising a major proportion of at least one acrylate monomer having the structure

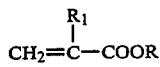

wherein R is an alkyl group having from 1 to 30 carbon atoms and $R_1$ is hydrogen, an alkyl group having from 1 to 8 carbon atoms or a halogen, and from about 1 to about 40 percent by weight of an olefinically unsaturated nitrile.

2. The method of claim 1 wherein the monomer mixture in (a) comprises from about 60 to about 95 percent by weight of acrylonitrile.

3. The method of claim 1 wherein the acrylate is methyl or ethyl or a mixture thereof.

4. The method of claim 1 wherein the olefinically unsaturated nitrile has the formula

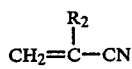

wherein $R_2$ is hydrogen, a lower alkyl group containing up to four carbon atoms or a halogen.

5. The method of claim 4 wherein the nitrile is acrylonitrile.

6. The method pf claim 1 wherein the other olefinic unsaturated monomer in (a) is an acrylate ester having the structure

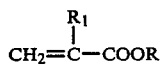

wherein R is an alkyl group having from about 1 to 30 carbon atoms and $R_1$ is hydrogen, an alkyl group having from 1 to 8 carbon atoms or a halogen.

7. The method of claim 6 wherein $R_1$ is hydrogen.

8. The method of claim 1 wherein the monomeric mixture polymerized in step (a) comprises from about 60 to 95 percent by weight of the nitrile and from 5 to 40 percent by weight of at least one other olefinically unsaturated monomer.

9. The method of claim 1 wherein the olefinic monomer constituent in step (b) comprises from 60 to 90 parts by weight of the acrylate monomer and from about 10 to 40 parts by weight of acrylonitrile.

10. The process of claim 1 wherein the co-monomer is an alpha-beta unsaturated nitrile, a vinyl aromatic compound or an acrylic compound.

11. The process of claim 1 wherein the co-monomer is acrylonitrile or styrene.

12. A method of preparing a stable latex of a film-forming polymer containing over 60 percent by weight of polymerized olefinically unsaturated nitrile comprising the steps of
(a) forming a main polymer core of latex particles by polymerizing in an aqueous medium a monomer mixture comprising from about 40 to 100 percent by weight of an olefinically unsaturated nitrile and from 0 to 60 percent by weight of at least one other olefinically unsaturated monomer which is copolymerizable with the nitrile, and
(b) forming a polymer shell over said polymer core by polymerizing in admixture with the polymer formed in step (a), an olefinic monomer constituent comprising a major proportion of at least one acrylate monomer having the structure

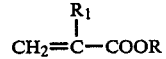

wherein R is an alkyl group having from 1 to 30 carbon atoms and $R_1$ is hydrogen, an alkyl group having from 1 to 8 carbon atoms or a halogen, and from about 1 to about 40 percent by weight of an olefinically unsaturated nitrile.

13. The method of claim 12 wherein the olefinically unsaturated nitrile has the formula

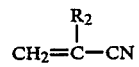

wherein $R_2$ is hydrogen, a lower alkyl group containing up to four carbon atoms or a halogen.

14. The method of claim 13 wherein $R_2$ is hydrogen.

15. The method of claim 12 wherein $R_1$ is hydrogen.

16. The method of claim 13 wherein the other olefinic unsaturated monomer in step (a) is an acrylate ester having the structure

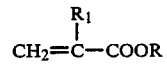

wherein R is an alkyl group having from about 1 to 30 carbon atoms and $R_1$ is hydrogen, an alkyl group having from 1 to 8 carbon atoms or a halogen.

17. The method of claim 16 wherein the acrylate ester is methyl acrylate or ethyl acrylate.

18. The method of claim 12 wherein the polymerization in step (b) is conducted by continuously adding the olefinic monomers constituent to the polymer formed in step (a).

19. The method of claim 12 wherein the monomers constituent in step (b) contains from 5 to 30 percent by weight of the nitrile.

20. A stable aqueous latex of a copolymer containing at least about 40 percent by weight of a polymerized olefinic unsaturated nitrile, said copolymer being comprised of a main polymer core of from about 40 to 100 percent by weight of the polymerized nitrile and from about 0 to about 60 percent by weight of at least one other polymerized olefinic monomer, wherein the main polymer core also contains a minor amount of a preformed homopolymer or copolymer of a conjugated diene in an amount to provide an overall concentration of the homopolymer or copolymer in the final latex of about 1 to 40 percent by weight on a solids basis per 100 parts of polymerized monomer in the latex, said main polymer core being overpolymerized with a copolymer comprising a major proportion of a polymerized acrylate derived from the structure

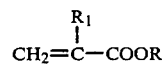

wherein R is an alkyl group containing from about 1 to about 30 carbon atoms and $R_1$ is hydrogen, an alkyl group having from about 1 to 8 carbon atoms or a halogen, and from about 1 to about 40 percent by weight of a polymerized olefinic unsaturated nitrile.

21. The latex of claim 20 wherein the olefinically unsaturated nitrile has the formula $$CH_2=\underset{\underset{R_2}{|}}{C}-CN$$

wherein $R_2$ is hydrogen, a lower alkyl group containing up to four carbon atoms or a halogen.

22. The latex of claim 21 wherein the nitrile is acrylonitrile.

23. The latex of claim 20 wherein the copolymer contains at least about 60 percent by weight of a polymerized olefinic unsaturated nitrile.

24. The latex of claim 20 wherein the other polymerized olefinic unsaturated monomer in the core is an acrylate ester having the structure $$CH_2=\underset{\underset{R_1}{|}}{C}-COOR$$

wherein R is an alkyl group having from about 1 to about 30 carbon atoms and $R_1$ is hydrogen an alkyl group containing up to 8 carbon atoms or a halogen.

25. The latex of claim 24 wherein the acrylate ester is methyl acrylate, ethyl acrylate, n-butyl acrylate or mixtures thereof.

26. The latex of claim 20 wherein the main polymer core is overpolymerized with from about 60 to 100 percent by weight of polymerized methyl acrylate, ethyl acrylate, or mixtures thereof.

27. The latex of claim 20 wherein the main polymer core is overpolymerized with a copolymer comprising from about 5 to 30 percent by weight of polymerized acrylonitrile.

28. A stable aqueous latex of a copolymer containing over 60 percent by weight of a polymerized olefinic unsaturated nitrile, said copolymer being comprised of a main polymer core of about 40 to 100 percent by weight of the polymerized nitrile and from about 0 to about 60 percent by weight of at least one other polymerized olefinic monomer, said main polymer core being overpolymerized with a major proportion of a polymerized acrylate derived from the structure $$CH_2=\underset{\underset{R_1}{|}}{C}-COOR$$

wherein R is an alkyl group containing from about 1 to about 30 carbon atoms and $R_1$ is hydrogen, an alkyl group having from about 1 to 8 carbon atoms or a halogen, and from about 1 to about 40 percent by weight of a polymerized olefinic unsaturated nitrile.

29. The latex of claim 28 wherein the core is overpolymerized with a copolymer comprising a major proportion of the acrylate and from 5 to 30 percent by weight of the nitrile.

30. The latex of claim 29 wherein the nitrile in the overpolymer is acrylonitrile.

31. The latex of claim 28 wherein the acrylates in the core and the overpolymer are each independently selected from the group consisting of methyl acrylate, ethyl acrylate, n-butyl acrylate or mixtures thereof.

* * * * *